(12) United States Patent
Fujii et al.

(10) Patent No.: US 7,646,127 B2
(45) Date of Patent: Jan. 12, 2010

(54) WINDING FOR THREE PHASE MOTOR

(75) Inventors: Yoshio Fujii, Kyoto (JP); Hideaki Suzuki, Kyoto (JP)

(73) Assignee: Nidec Corporation, Kyoto (JP)

( * ) Notice: Subject to any disclaimer, the term of this patent is extended or adjusted under 35 U.S.C. 154(b) by 67 days.

(21) Appl. No.: 11/954,390

(22) Filed: Dec. 12, 2007

(65) Prior Publication Data
US 2008/0136283 A1 Jun. 12, 2008

(30) Foreign Application Priority Data
Dec. 12, 2006 (JP) .............................. 2006-334197

(51) Int. Cl.
*H02K 3/00* (2006.01)
(52) U.S. Cl. ....................................... 310/179; 310/201
(58) Field of Classification Search ................. 310/201, 310/179–180, 184, 208
See application file for complete search history.

(56) References Cited

U.S. PATENT DOCUMENTS

| 3,802,066 | A | * | 4/1974 | Barrett .......................... 29/596 |
| 4,692,646 | A | * | 9/1987 | Gotou .......................... 310/184 |
| 5,714,822 | A | * | 2/1998 | Kawano et al. ............. 310/179 |
| 5,825,113 | A | * | 10/1998 | Lipo et al. ................... 310/181 |
| 7,180,217 | B2 | * | 2/2007 | Nakayama et al. .......... 310/179 |
| 7,302,749 | B2 | * | 12/2007 | Kreuzer et al. ................ 29/596 |

* cited by examiner

*Primary Examiner*—Michael C Zarroli
(74) *Attorney, Agent, or Firm*—Keating & Bennett, LLP

(57) ABSTRACT

In a stator of a motor, a first winding of each coil is arranged around three teeth next to one another and a second winding of each coil is arranged around three teeth with a tooth which is arranged at an end of the three teeth for the first winding at a center thereof. By virtue of such configuration, each coil is arranged around four teeth in a distributed manner.

6 Claims, 11 Drawing Sheets

WINDING FOR THREE PHASE MOTOR

BACKGROUND OF THE INVENTION

1. Field of the Invention

The present invention relates to a motor.

2. Description of the Related Art

In recent years, various components and mechanisms used in a vehicle have been developed with a specific focus on environmental concerns (e.g., energy efficiency, reduction of carbon dioxide emission, and the like). One of such mechanisms is an "idling stop" mechanism which allows an engine of a vehicle not in motion to automatically stop in order to reduce the carbon dioxide emission.

However, when a compressor is activated by the engine of such vehicle, each time the engine stops the components activated by the compressor, such as an air conditioner, also stop. In order to avoid such inconvenience, the compressor of the components, such as an air conditioner, is operated by a motor (e.g., IPM (Interior Permanent Magnet)). That is, the compressor is activated by a car battery, which allows the air conditioner to continue to operate even while the engine is not running.

Generally, when the rpm of a motor increases, the voltage (i.e., back electromotive force) induced by the coil in the motor also increase. When such voltage equals the voltage of the drive power source, the increase of the rpm stops, that is, the rpm is compromised. The motor used in the vehicle needs to run on a relatively low powered car battery while a wide range of rpm is required. Therefore, in order to increase the rpm of the motor, some technologies have been developed.

For example, the international publication No. WO 2004/010562 discloses a technology (flux weakening control) to increase the rpm of a motor.

However, according to the technology disclosed above, when each coil in a stator includes a plurality of teeth (i.e., distributed winding), the efficiency of the flux weakening control varies depending on the rotational angle of a rotor core. In particular, when an entire magnetic pole of the rotor core is arranged opposite to a coil of the stator, the degree of the reduction of the magnetic flux becomes great, and when a portion of the magnetic pole of the rotor core is arranged opposite to the coil of the stator, the degree of the reduction of the magnetic flux becomes small.

As described above, when the degree of the reduction of the entire magnetic flux is varied depending on the rotational angle of the rotor angle, the rpm of the motor will be compromised.

SUMMARY OF THE INVENTION

In order to overcome the problems described above, preferred embodiments of the present invention provide a motor including a control portion that executes flux weakening control with respect to a three phase excitation current supplied to a stator. The stator includes a plurality of coils disposed around a plurality of teeth each extending in a radial direction and arranged in a circumferential direction so as to be spaced evenly apart from one another centered around a central axis.

Each coil preferably includes a first winding formed around three teeth and a second winding disposed around three teeth with one tooth arranged at an end of the three teeth of the first winding. Note that the number of the first winding and the second winding is the same.

By virtue of such configuration, the flux weakening control will be executed effectively in the motor according to preferred embodiments of the present invention.

Other features, elements, steps, characteristics and advantages of the present invention will become more apparent from the following detailed description of preferred embodiments thereof with reference to the attached drawings.

BRIEF DRAWING OF THE DRAWING

DETAILED DESCRIPTION OF PREFERRED EMBODIMENTS

Figure 1:
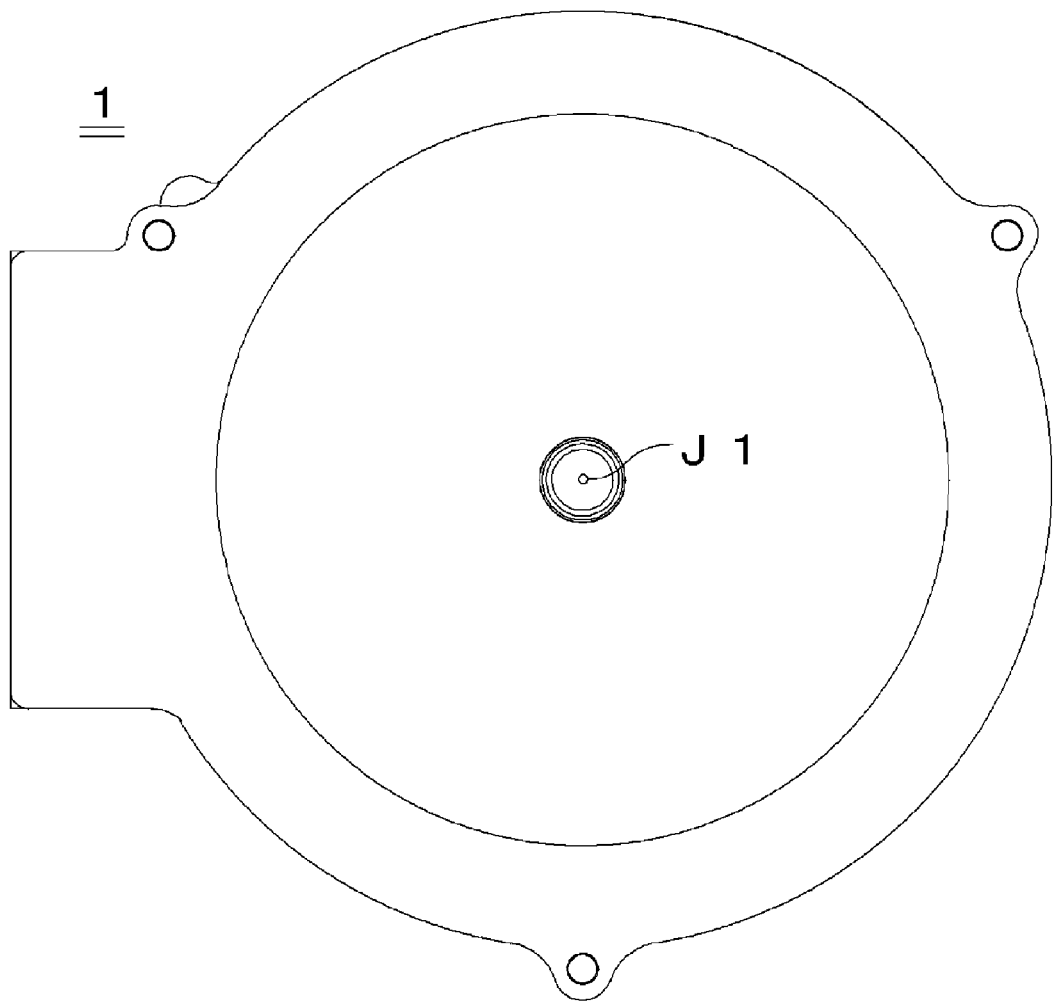
FIG. 1 is a schematic plan view of an exterior of a motor according to a preferred embodiment of the present invention.

Note that in the description of preferred embodiments of the present invention herein, words such as upper, lower, left, right, upward, downward, top and bottom for describing positional relationships between respective members and directions merely indicate positional relationships and direction in the drawings. Such words do not indicate positional relationships and directions of the members mounted in an actual device. Also note that reference numerals, figure numbers and supplementary descriptions are shown below for assisting the reader in finding corresponding components in the description of the preferred embodiments below to facilitate the understanding of the present inventions. It is understood that these expressions in no way restrict the scope of the present invention.

Figure 2:
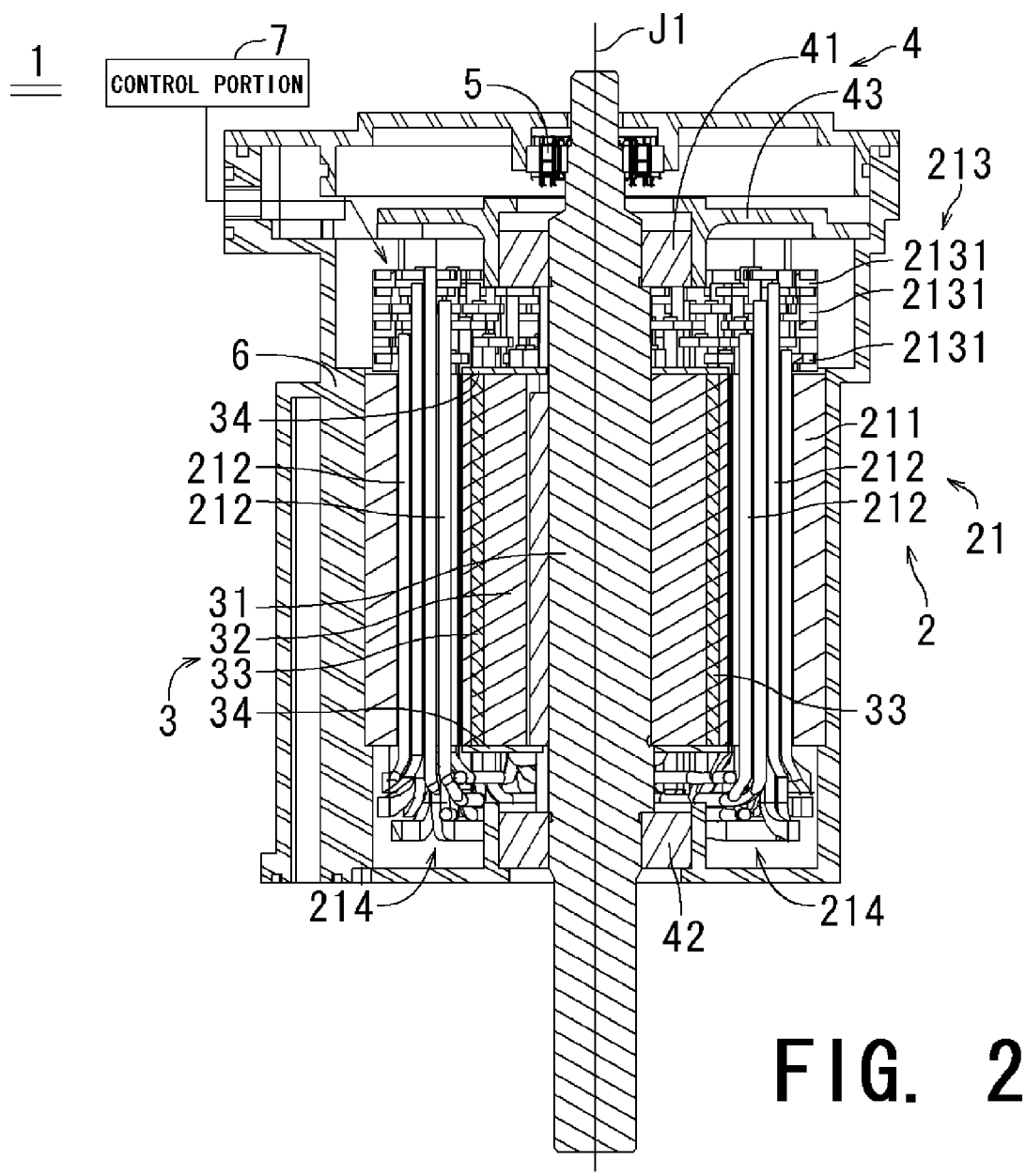
FIG. 2 is a schematic cross sectional view in an axial direction of the motor shown in FIG. 1.

FIG. 1 is a schematic plan view of an exterior of a motor 1 according to a first preferred embodiment of the present invention. FIG. 2 is a schematic cross sectional view of the motor 1.

The motor 1 is a three phase motor which will be used as a compressor for an air conditioner, or the like, in a vehicle having an idling stop mechanism (that is, a mechanism for automatically stopping an engine of the vehicle when not in motion). As shown in FIG. 2, the motor 1 is preferably configured such that the central axis J1 is approximately twice as long as a radial length thereof.

As shown in FIG. 2, the motor 1 which is an inner rotor type motor preferably includes a stator portion 2 which is a fixed assembly, a rotor portion 3 which is a rotatable assembly, a bearing mechanism 4 which is arranged at the stator portion 2 and rotatably supports the rotor portion 3 with respect to the stator portion 2 in a concentric manner with the central axis J1, a resolver portion 5 which detects a rotational angle of the rotor portion 3 relative to the stator portion 2, and a housing 6 which accommodates therein the stator portion 2, the rotor portion 3, the bearing mechanism 4 and the resolver portion 5. The housing 6 preferably includes a cylindrical portion for retaining the stator 21 (described below), and a bottom portion for covering a lower side of the stator 21.

The bearing mechanism 4 preferably includes, as shown in FIG. 2, an upper bearing 41 and a lower bearing 42 which are attached respectively at an upper portion and a lower portion of the rotor core 32 to a shaft 31, and a bearing holder 43 which is affixed to the housing 6 and in which the upper bearing 41 is accommodated. The lower bearing 42 is accommodated in an accommodation portion arranged at a bottom central portion of the housing 6 having a substantially cylindrical side wall.

Figure 3:
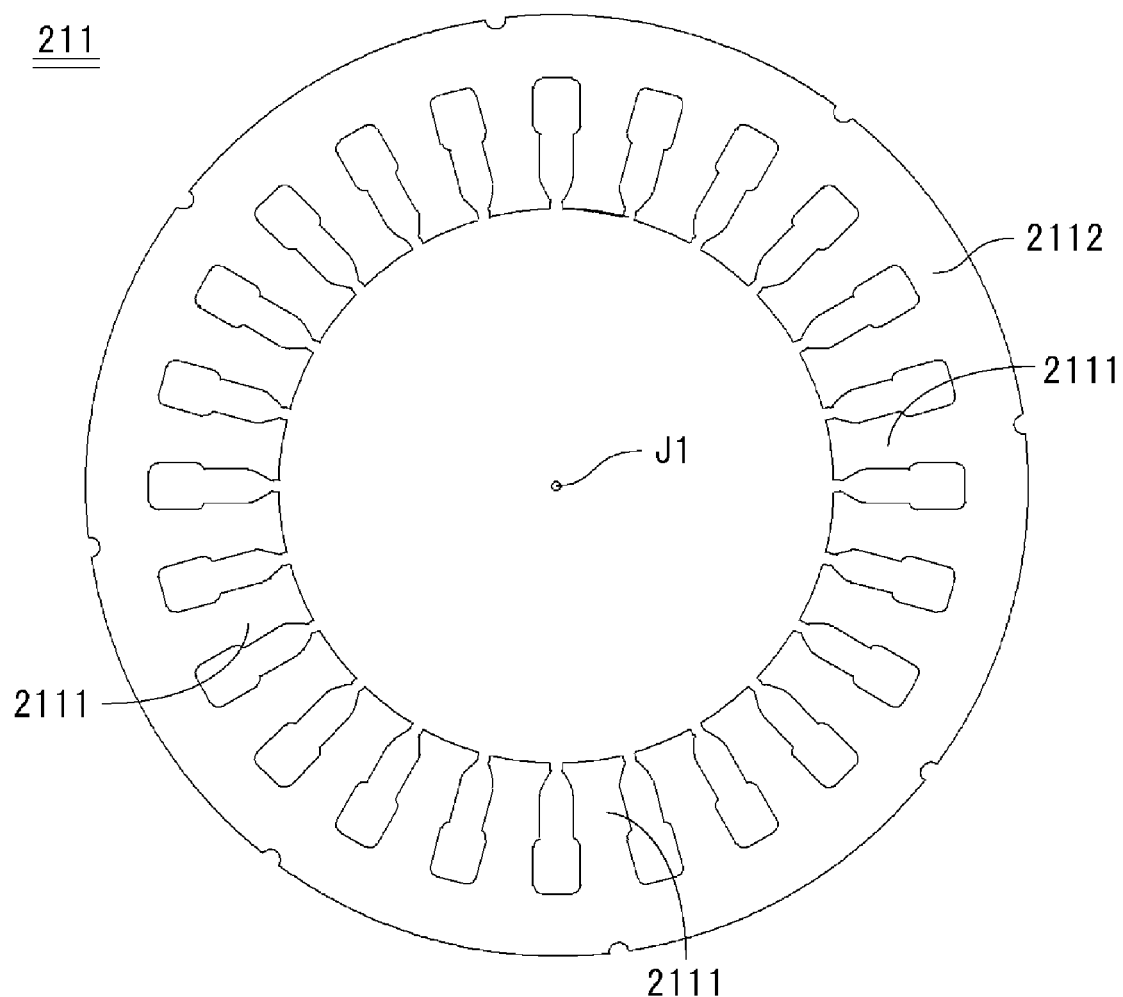
FIG. 3 is a schematic plan view of a stator core of a stator according to a preferred embodiment of the present invention.

The stator portion 2 preferably includes the stator 21 arranged at an inner circumferential surface of the housing 6. The stator 21 preferably includes a stator core 211 which is formed by laminating a plurality of thin silicon steel plates on top of another. FIG. 3 is a schematic plan view of the stator core 211 according to the present preferred embodiment. As shown in FIG. 3, the stator core 211 preferably includes a plurality (for example, 24 in the present preferred embodiment) of teeth 2111 each extending outwardly in the radial direction, arranged so as to be spaced evenly apart from one another centered about the central axis J1, and a core back portion 2112 having a substantially annular shape arranged at an end portion of the teeth away from the central axis J1.

Figure 4:
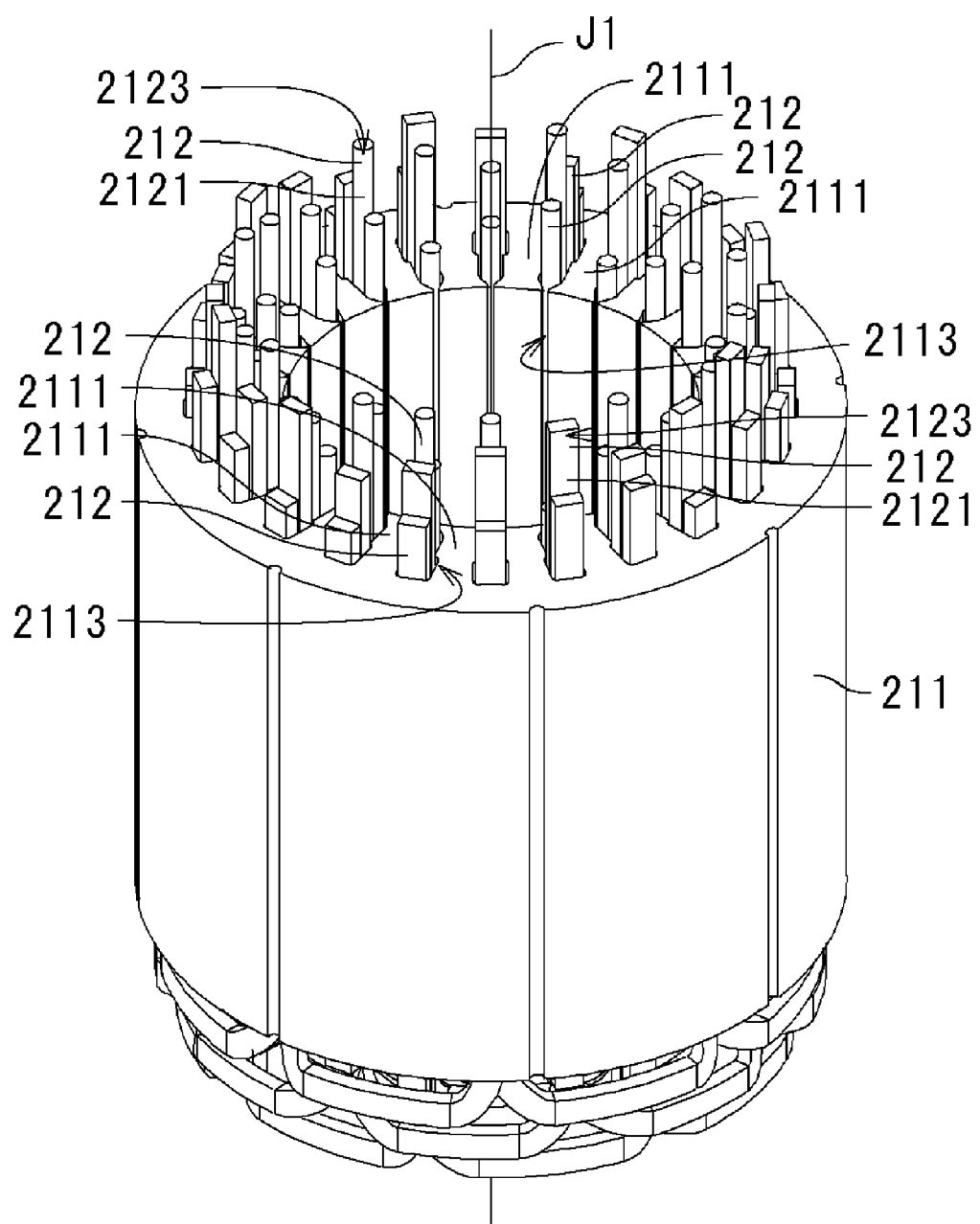
FIG. 4 is a schematic perspective view of a plurality of wires connected to the stator core of the stator according to a preferred embodiment of the present invention.

FIG. 4 is a schematic perspective view of the stator core 211 and a plurality (for example, 48 in the present preferred embodiment) of wires 212 each attached to the stator core 211. As shown in FIG. 4, each wire 212 preferably includes an end portion 2123 (described below) extending in a parallel or substantially parallel manner with the central axis J1 at a slot 2113 which is arranged between each two adjacent teeth 2111 (i.e., in total, the stator core 211 preferably includes 24 of slots 2113, for example).

Figure 5A:
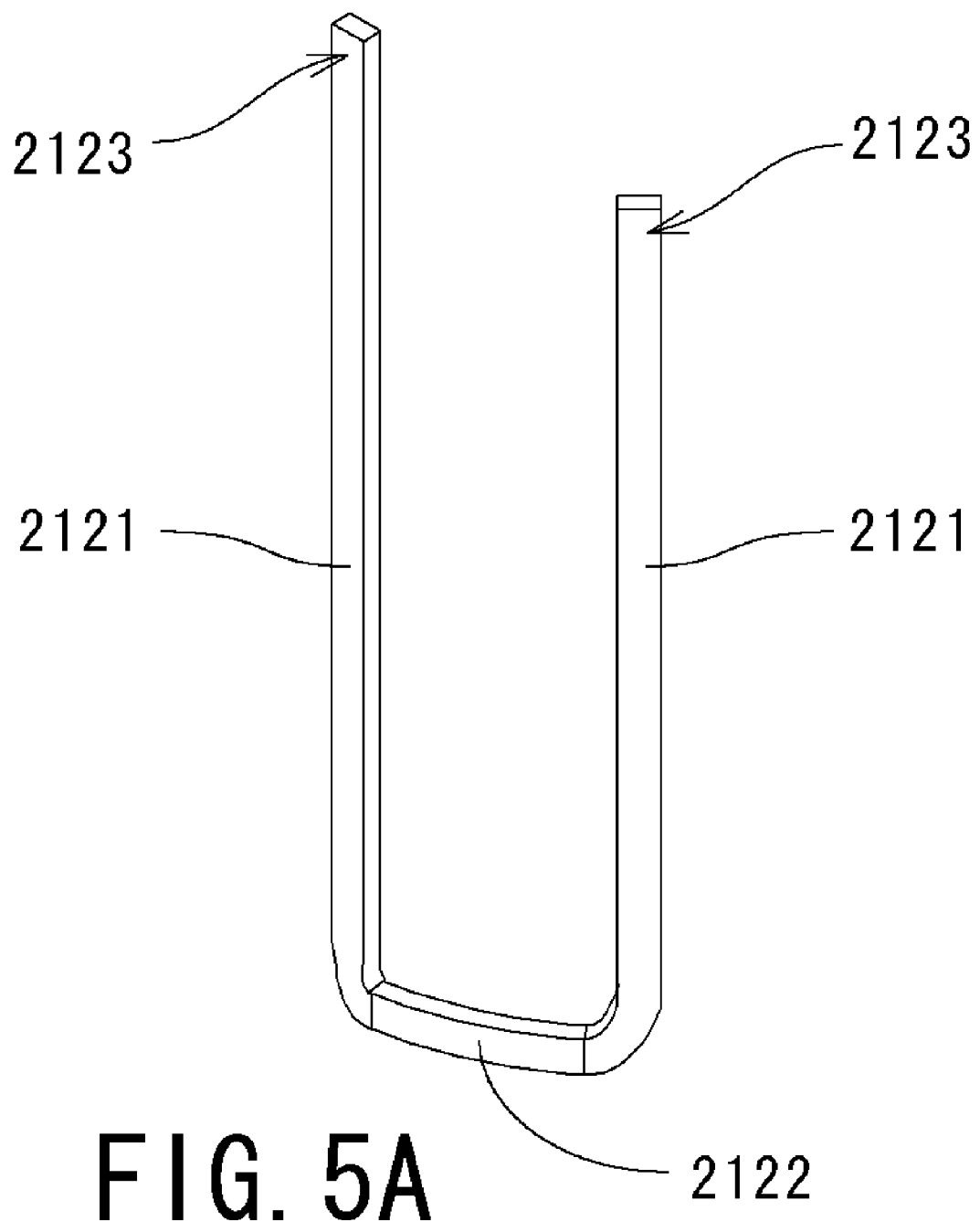
FIG. 5A is a schematic cross sectional view of an angular wire according to a preferred embodiment of the present invention.
Figure 5B:
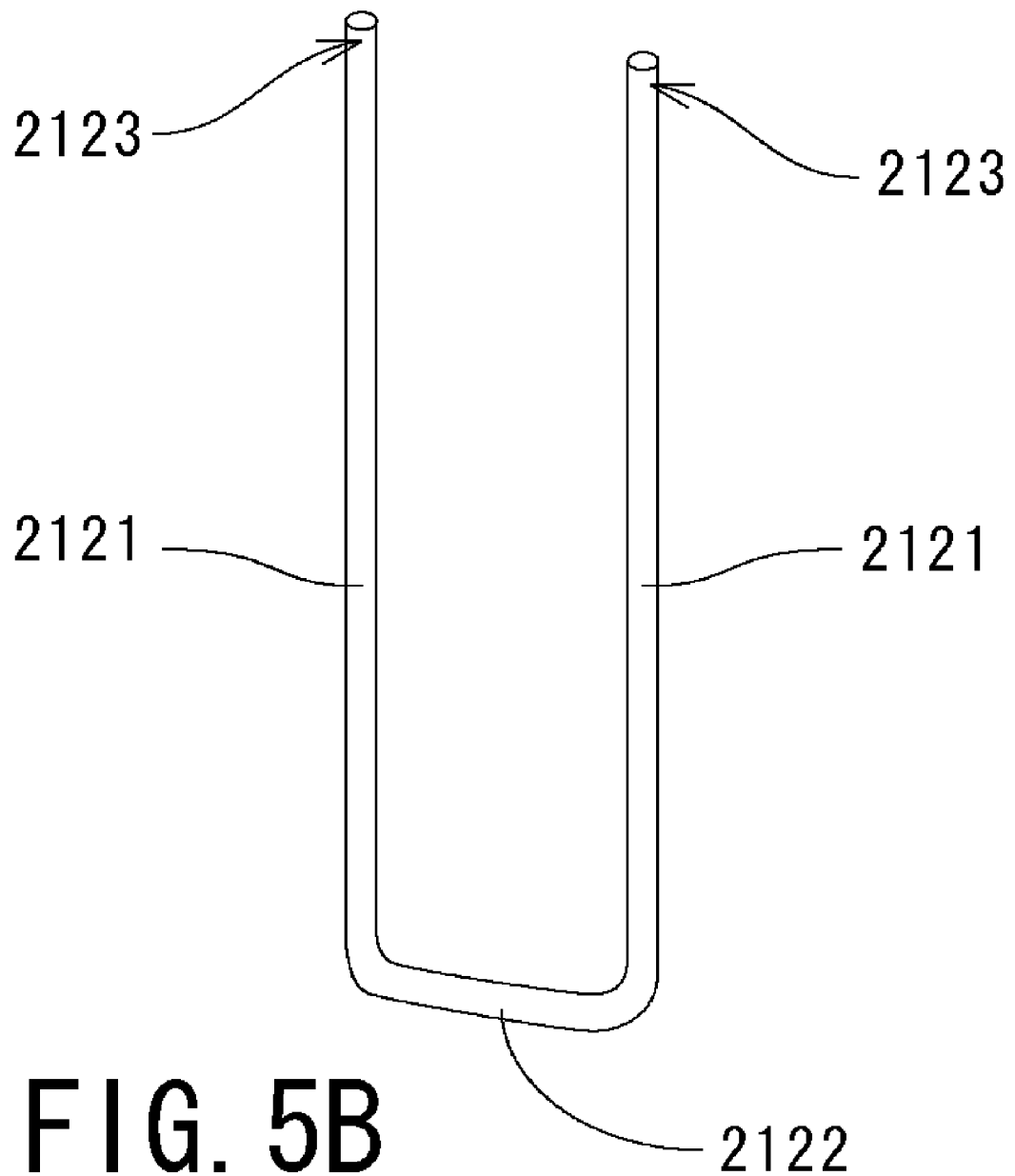
FIG. 5B is a schematic cross sectional view of a round wire according to a preferred embodiment of the present invention.

As shown in FIGS. 5A and 5B, the wires 212 include a plurality of angular wires 212a and a plurality of round wires 212b. Note that in the description hereafter the angular wire 212a and the round wire 212b will be collectively referred to as the wire 212 unless the distinction therebetween is necessary.

The angular wires 212a and the round wires 212b are accommodated in corresponding slots 2113 (see FIG. 4). As shown in FIGS. 5A and 5B, the angular wire 212a and the round wire 212b each include a pair of straight portions 2121 extending in a manner parallel or substantially parallel to the central axis J1, and a connecting portion 2122 which connects continuously the pair of the straight portions 2121 at an axially bottom portion so as to form an approximately U-shaped configuration. As shown in FIG. 4, the wires 212 each include a pair of the end portions which protrude in an upward direction from the slot 2113.

Figure 6:
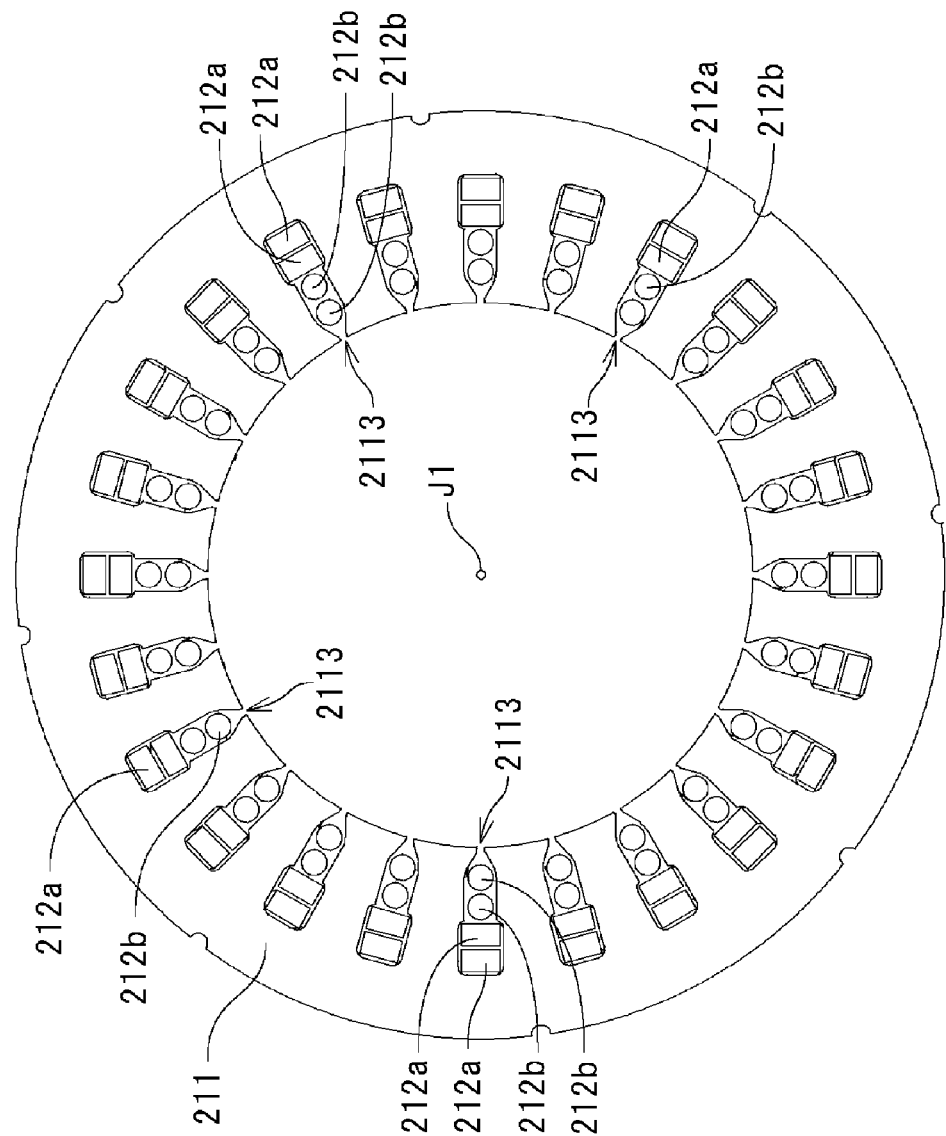
FIG. 6 is a schematic cross sectional view in a perpendicular manner with respect to a central axis of the stator core and the wires according to a preferred embodiment of the present invention.

FIG. 6 is a schematic cross sectional view of the stator core 211 and the wires 212 (the angular wires 212a and the round wires 212b). Note that, for clarity of illustration, FIG. 6 omits parallel diagonal lines at the cross section of the stator core 211 and the wire 212. As shown in FIGS. 5A, 5B and 6, each slot 2113 of the stator core 211 has arranged therein two angular wires 212a and two round wires 212b in the radial direction. Note that the round wires 212b are arranged nearer to the central axis J1 than the angular wires 212a are.

As shown in FIG. 2, the stator 21 preferably includes a bus bar unit 213 which is arranged axially above the stator core 211 and connected to the end portion 2123 (see FIG. 4) of the wire 212. The bus bar unit 213 having a substantially annular shape centered about the central axis J1 preferably includes a plurality (for example, 6 in the present preferred embodiment) of bus bar plates 2131 which define a terminal block.

The stator 21 preferably includes a plurality of coils 214 each formed by wires 212 wound in a distributed manner around a set of three teeth 2111 next to one another as a unit. That is, two slots 2113 which are next to one another are sandwiched between two slots 2113 through which a single wire 212 including two straight portions 2121 is arranged. According to the present preferred embodiment, each coil 214 preferably includes the wire 212 wound around the teeth two times and is formed of each angular wire 212a and round wire 212b connected to one another. Note that each coil 214 is connected to an external power supply via the bus bar unit 213.

According to the motor 1 of the present preferred embodiment, a flux weakening control is executed by a control portion 7 with respect to a three phase excitation current which is conducted to the coils 214 of the stator 21. By executing the flux weakening control, the voltage (that is, the back electromotive force) induced at the stator portion 2 will be reduced and thereby maximum rotation will be increased. To be more specific, by advancing (that is, by shifting the phase of the excitation current) the three phase excitation current of the motor 1, a magnetic field generated between the stator portion 2 and the rotor portion 3 is weakened in order to reduce an entire magnetic flux. Consequently, the voltage induced at the stator portion 2 is reduced which increases the value of a maximum rpm of the motor 1.

Figure 7A:
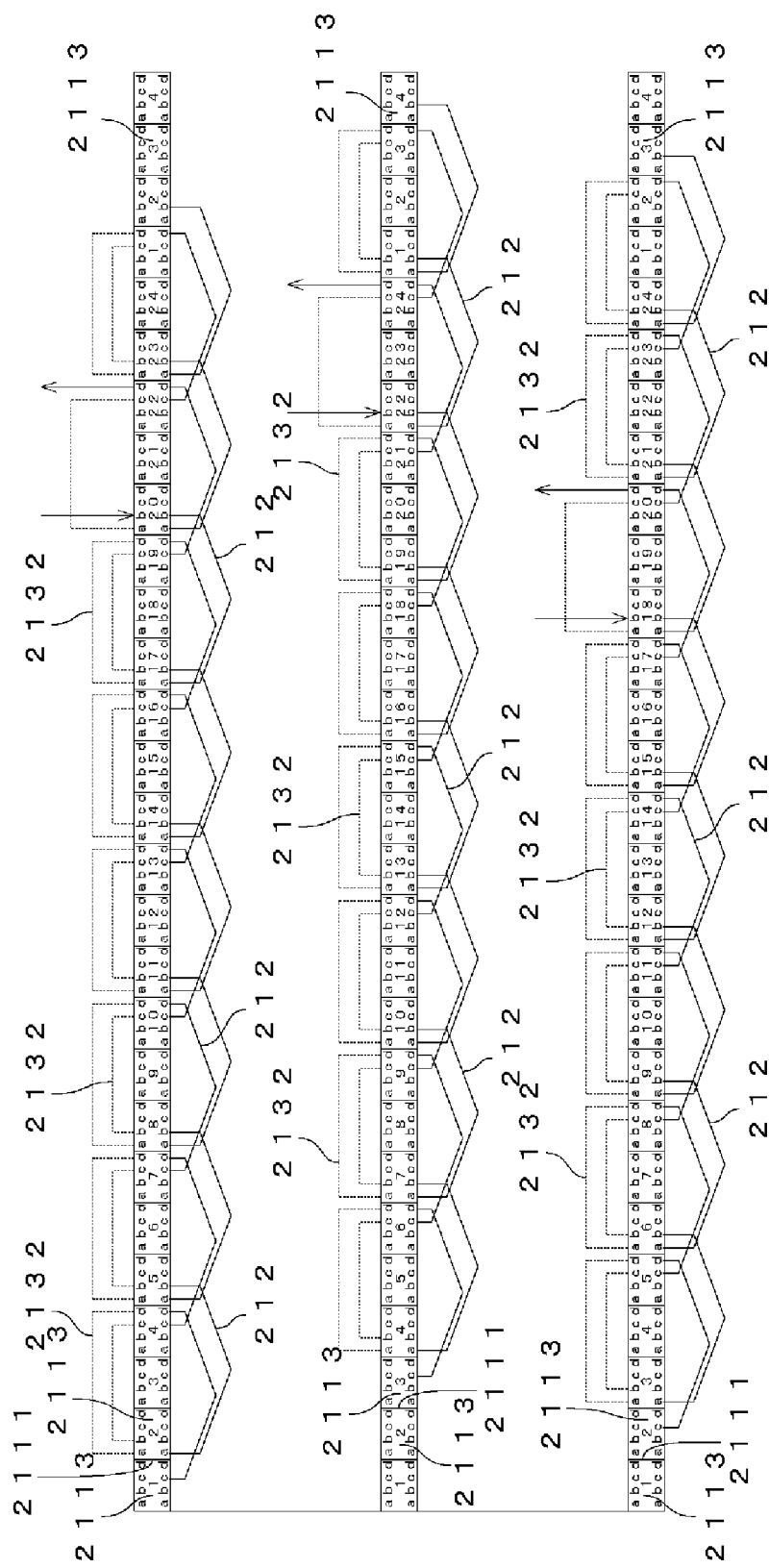
FIG. 7A is a schematic diagram showing a configuration of a coil according to a preferred embodiment of the present invention.
Figure 7B:
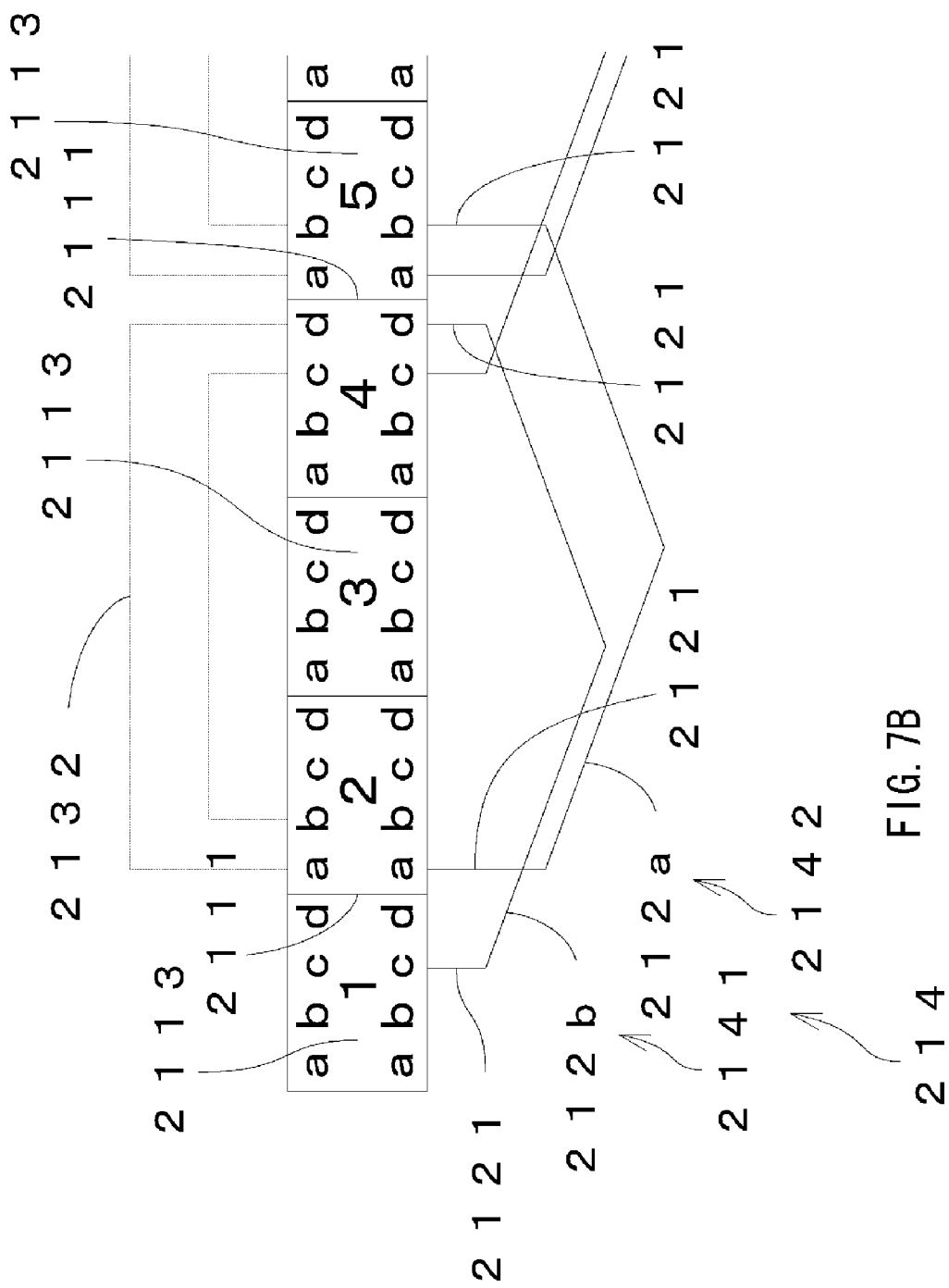
FIG. 7B is an enlarged view of the coil shown in FIG. 7A.

Next, the coil 214 according to the present preferred embodiment will be described. FIG. 7A is a schematic diagram showing a configuration of the coils 214 according to the present preferred embodiment of the present invention. FIG. 7B is an enlarged view of a portion of the coils 214 shown in FIG. 7A. FIGS. 7A and 7B each show a configuration of the three phases (U, V and W phases from top to bottom, respectively) of coils 214. Each box shown in FIG. 7A having assigned a number (1 to 24) thereto indicates the corresponding slot 2113 of the stator core 211, wherein each alphabet ("a" to "d") in the box indicates a position of the wire 212 with respect to the slot 2113. Note that the alphabet "a" indicates a slot 2113 furthest from the central axis J1, and "d" indicates a slot 2113 nearest to the central axis J1.

Note that a line bordering two boxes indicates a tooth 2111 arranged between two slots 2113. Also, a plurality of broken lines denoted above the slots 2113 indicate the bus bar 2132; and the solid line denoted below the slots 2113 indicate the wires 212.

As shown in FIG. 7B, the round wire 212b has one of its straight portions 2121 arranged at a position "c" of the slot 2113 having assigned thereto the number "1" (hereinafter, referred to as "first slot 2113") and has the other straight portion 2121 arranged at a position "d" of the slot 2113 having assigned thereto the number "4" (fourth slot 2113), and then the wire 212b will be connected, via the bus bar 2132, to one of the straight portions 2121 of the angular wire 212a arranged at a position "a" of the slot 2113 having assigned thereto the number "2" (second slot 2113). The other straight portion 2121 of the above mentioned angular wire 212a will be arranged at a position "b" of the fifth slot 2113. By virtue of such configuration, one coil 214 is formed around four teeth 2111 next to one another in a distributed manner. In particular, a set of three adjacent teeth next to one another wound by the round wire 212b will be referred to as "first winding 2141", and a set of three teeth next one another wound by the angular wire 212*a* will be referred to as "second turn 2141". Also note that each coil 214 includes at least one first winding 2141 and one second winding 2142.

For example, the first winding 2141 preferably is formed around three teeth 2111 next to one another between the first slot 2113 and the fourth slot 2113; and the second winding 2142 preferably is formed around three teeth 2111 next to one another between the second slot 2113 and the fifth slot 2113. In other words, a tooth 2111 which is at an end (i.e., between the third slot 2113 and the fourth slot 2111) of the three teeth 2111 for the first winding 2141 will be a center of the three teeth 2111 (i.e., the teeth 2111 between the second slot 2113 and the fourth slot 2113) around which the second winding 2142 is formed.

In the stator 21, a plurality of coils 214 of U phase, V phase and W phase are formed over four teeth 2111 which are next to one another. The first winding 2141 of each coil 214 is formed continually around three of four teeth 2111, and the second winding 2142 is formed around three of the same four teeth 2111 including the one tooth 2111 which is not part of the first winding 2141.

As described above, in the stator 21 of the motor 1, each of the plurality of coils 214 are formed around four teeth 2111 next to one another; the first winding 2141 of each coil 214 is formed around the three teeth 2111 next to one another; the second winding 2142 is formed around three teeth 2111 with a tooth 2111 which is at an end of the three teeth 2111 forming the first winding at a center thereof. Conventionally, in a three phase motor having the distributed winding type coils, each coil is formed around three teeth next to one another. When the flux weakening control is executed in the three phase motor, and when one of the entire magnetic pole of the rotor core is arranged opposite to one of the coils of the stator (i.e., one of the magnetic poles of the stator), a degree of weakening for the entire magnetic flux becomes great and a degree of reduction of the back electromotive force also becomes great. On the contrary, when only a portion of magnetic pole of the rotor core is arranged opposite to one of the coils, the degree of weakening of the entire magnetic flux becomes small and the degree of reduction of the back electromotive force also becomes small.

On the other hand, in the motor 1 according to the present preferred embodiment of the present invention, each coil 214 is distributedly wound around four teeth 2111 and therefore, has, compared with a coil formed around three teeth, a wider width. By virtue of such configuration, an amount of time a magnetic pole of the rotor core 32 is arranged opposite to a magnetic pole of the stator 21 while the rotor portion 3 is in motion is, compared with the conventional motor, longer. Also, by virtue of such configuration, the degree of weakening, caused by the flux weakening control, for the entire magnetic flux will be evenly distributed regardless of the rotational angle of the rotor core 32, and the maximum value of the back electromotive force is minimized.

Figure 8A:
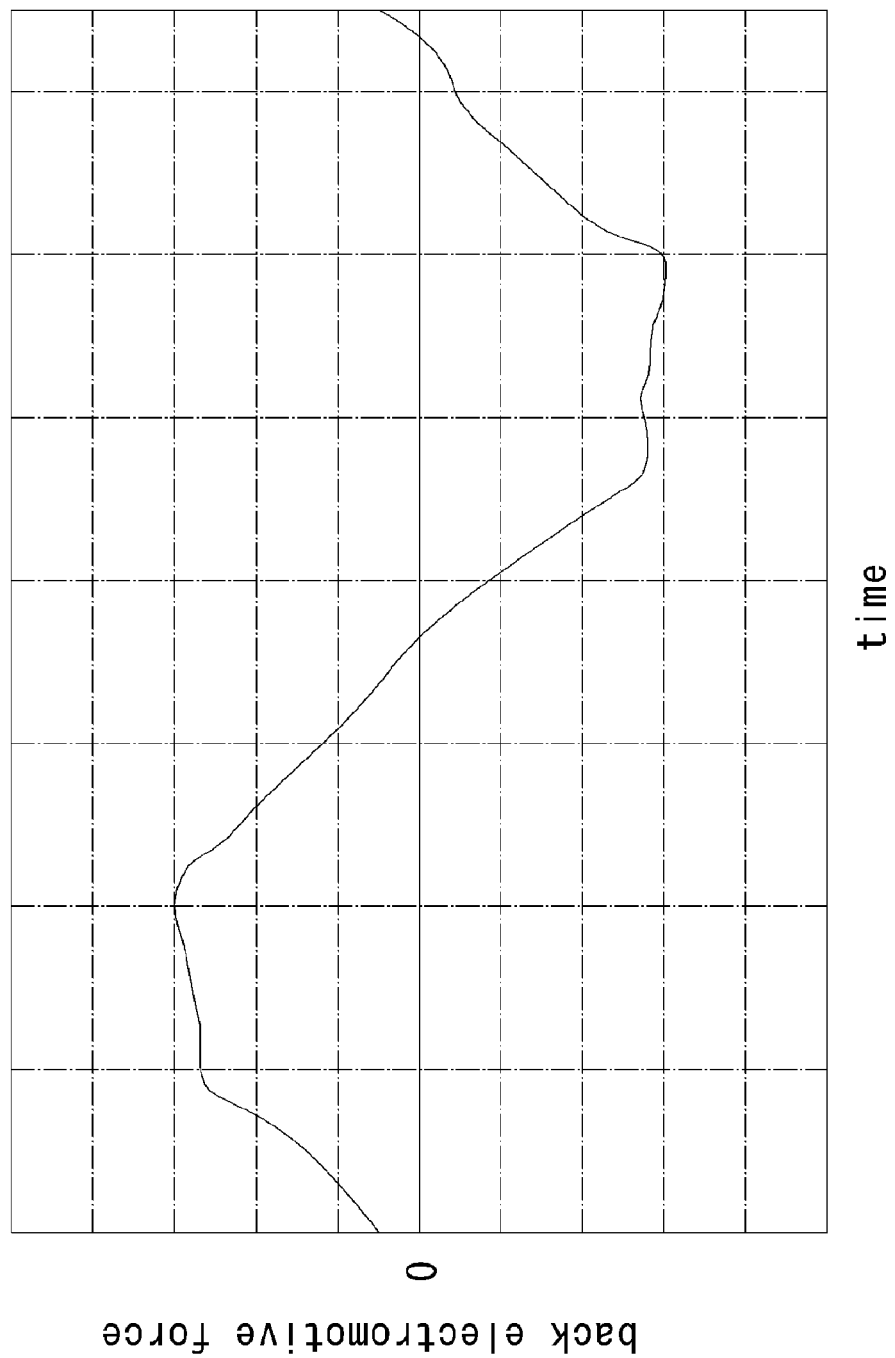
FIG. 8A is a graph indicating a back electromotive force according to a preferred embodiment of the present invention.
Figure 8B:
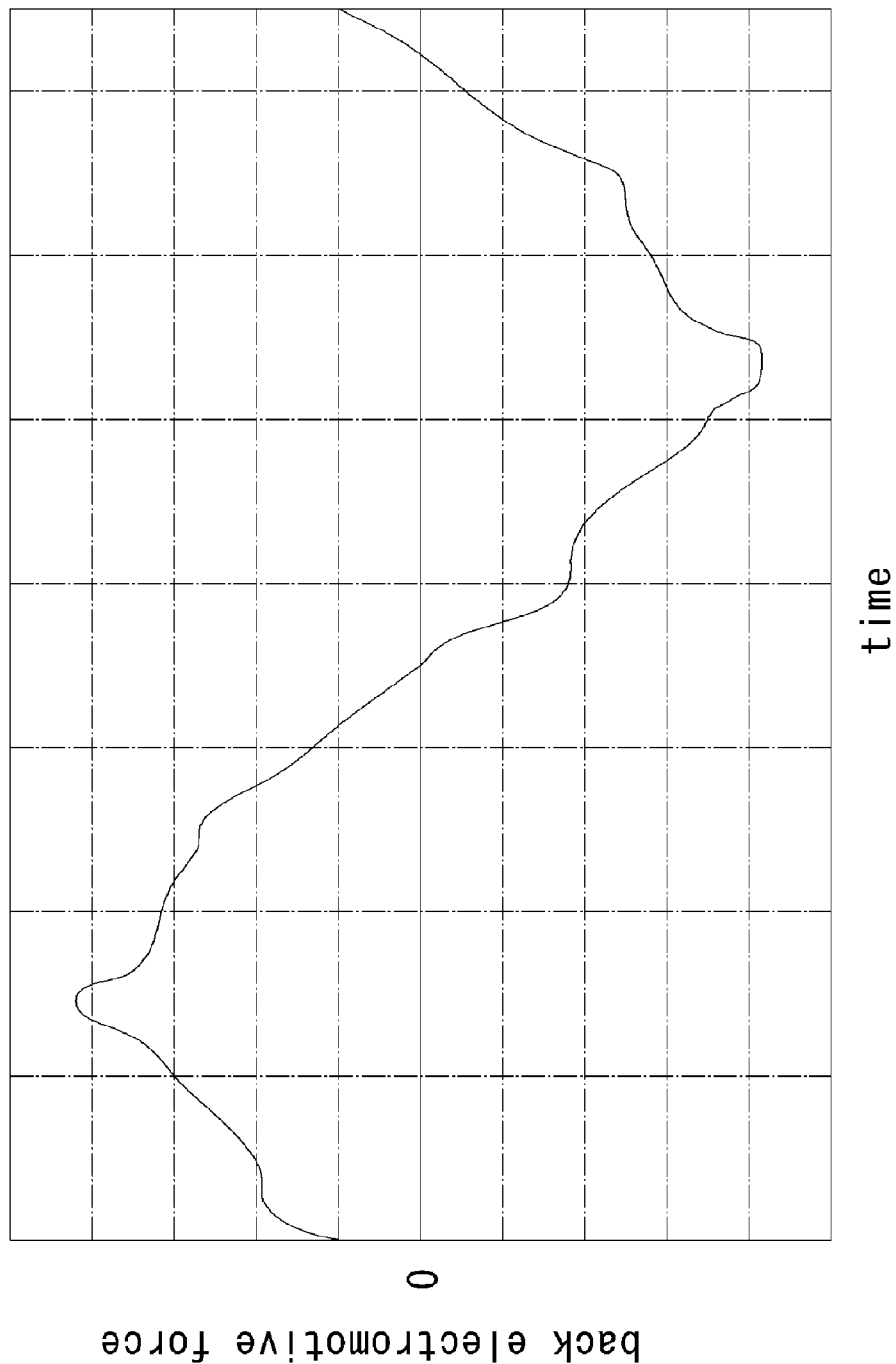
FIG. 8B is a graph indicating a back electromotive force according to a comparative motor.

FIG. 8A is a graph indicating the back electromotive force of the motor 1; and FIG. 8B is a graph indicating the back electromotive force according to the comparative motor in which coils are formed around three teeth next to one another. Note that the vertical axis in the graphs shown in FIGS. 8A and 8B indicates the back electromotive force and the horizontal axis indicates time in order to indicate the change in the back electromotive force for a cycle. Also note that values of the back electromotive force indicated in the graphs are obtained via a simulation. According to the graphs, it can be seen that the change of the back electromotive force is substantially reduced and equalized in the motor 1 according to the present preferred embodiment of the present invention (i.e., the change takes place in a smoother manner). The maximum value of the back electromotive force is, compared with the comparative motor, reduced by approximately 25%.

Since the maximum rpm of a motor is influenced by the back electromotive force (in particular, the maximum value thereof), when the maximum value of the back electromotive force is reduced as described above, the rpm of the motor will be increased. According to the motor 1 of the present preferred embodiment of the present invention, since the coils 214 each include four teeth 2111 in the distributed winding manner, the flux weakening control will be executed effectively, and thereby increasing the maximum rpm of the motor 1.

According to the motor 1 of another preferred embodiment, each coil 214 which is disposed around four teeth preferably includes two of the first windings 2141 and two of the second winding 2142 (each of which is formed around three teeth in the above stated manner). By virtue of such configuration, the flux weakening control will be executed effectively which increases the maximum rpm of the motor 1.

It is important for a motor used as the compressor for an air conditioner to be effective at a wide range of rpm. The motor 1 according to preferred embodiments of the present invention is operable to increase rpm due to the effective execution of the flux weakening control, and therefore is particularly suitable for use as the compressor for the air conditioner or the like.

Also, although the motor used as the compressor for the air conditioner in the vehicle is activated by a car battery which has a relatively low voltage, such motor is required to have a large output, and therefore, the wire used to form the coils therein have a large diameter and therefore the number of turns of the coils is limited. The motor 1 according to the preferred embodiments of the present invention is particularly suitable for such motor which has coils with limited number of turns (for example, two or four turns).

While the present invention has been described in detail, the forgoing description is in all aspects illustrative and not restrictive. It is understood that numerous modifications and variations can be devised without departing from the scope of the invention.

For example, the number of windings for each coil 214 is not necessarily restricted to 2 or 4. However, it is to be noted that since the number of turns for the first turns 2141 and the second turns 2142 must be equal to one another, the number of turns will preferably be an even number.

Note that although the description above assumes that each coil 214 includes both the angular wire 212*a* and the round wire 212*b*, the present invention is not limited thereto. Also note that the connecting portion 2122 may have a shape other than the approximately U-shaped configuration described above.

The motor as described above according to the preferred embodiment of the present invention does not need to be the inner rotor type motor in which a field magnet 33 is arranged at an inside of the stator 21; the motor may be an outer rotor type motor in which the field magnet 33 is arranged outside of the stator 21. Note that the motor according to the present invention may be used as a component other than the compressor in the air conditioner in a motor vehicle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
 a stator; and
 a control portion arranged to execute flux weakening control with respect to a three phase excitation current supplied to the stator; wherein
 the stator includes:
  a stator core having a plurality of teeth extending in a radial direction and arranged in a circumferential direction so as to be spaced evenly apart from one another and centered about a central axis to thereby define a plurality of slots between the plurality teeth;
  a first slot, a second slot, a third slot, a fourth slot, and a fifth shot, each of the first slot, the second slot, the third slot, the fourth slot, and the fifth slot are arranged between respective pairs of the teeth and each of the first slot, the second slot, the third slot, the fourth slot, and the fifth slot are directly adjacent to one another in the circumferential direction;
  a plurality of coils arranged to extend through the plurality of slots in a distributed winding manner;
  each of the plurality of coils including:
   a first winding arranged in both the first slot and the fourth slot; and
   a second winding arranged in the second slot and the fifth slot.

2. The motor according to claim 1, wherein the number of windings for each coil is even.

3. The motor according to claim 1, wherein each of the coils includes an angular wire and a round wire.

4. The motor according to claim 3, wherein each of the angular wire and the round wire are approximately arranged in a U-shape that includes a pair of straight portions extending substantially parallel to the central axis, and a connecting portion continuously connecting the pair straight portions at an axially bottom portion thereof.

5. The motor according to claim 1, wherein the motor is a three phase motor.

6. The motor according to claim 1, wherein the motor is an inner rotor motor in which a field magnet is arranged inside of the stator.

* * * * *